United States Patent [19]

Bronstert

[11] Patent Number: 4,602,068

[45] Date of Patent: Jul. 22, 1986

[54] CHLORINATION OF POLYMERS

[75] Inventor: Klaus Bronstert, Carlsberg, Fed. Rep. of Germany

[73] Assignee: BASF Aktiengesellschaft, Ludwigshafen, Fed. Rep. of Germany

[21] Appl. No.: 682,549

[22] Filed: Dec. 17, 1984

[30] Foreign Application Priority Data

Dec. 21, 1983 [DE] Fed. Rep. of Germany ....... 3346137

[51] Int. Cl.$^4$ .......................... C08C 19/14; C08F 8/22
[52] U.S. Cl. .................................. 525/356; 522/131; 522/133
[58] Field of Search .................... 525/356; 204/159.18

[56] References Cited

U.S. PATENT DOCUMENTS

| | | | |
|---|---|---|---|
| 3,597,408 | 8/1971 | Trieschmann | 260/94.9 |
| 3,923,473 | 12/1975 | Sandy | 44/79 |
| 4,377,459 | 3/1983 | Parker | 525/356 |
| 4,381,374 | 4/1983 | Hillman | 525/356 |
| 4,386,189 | 5/1983 | Ackerman | 525/358 |
| 4,425,206 | 1/1984 | Hutchinson | 525/356 |

FOREIGN PATENT DOCUMENTS

| | | |
|---|---|---|
| 854775 | 10/1970 | Canada. |
| 815088 | 6/1959 | United Kingdom. |
| 1004193 | 9/1965 | United Kingdom. |

*Primary Examiner*—Jacob Ziegler
*Attorney, Agent, or Firm*—Keil & Weinkauf

[57] ABSTRACT

Solid organic polymers are chlorinated with chlorine to give chlorinated polymers in the presence of a solvent which contains from 20 to 100% by weight of phosgene and in which the polymer is dissolved or suspended, at or below the boiling point of the mixture of chlorine and solvent, by initiating the reaction with actinic light or another initiator which produces free radicals. A mixture of not less than 50% by weight of phosgene and a chlorofluorocarbon or chlorofluorohydrocarbon, such as chlorotrifluoromethane, can also be used as the solvent, but phosgene is most suitable.

5 Claims, 4 Drawing Figures

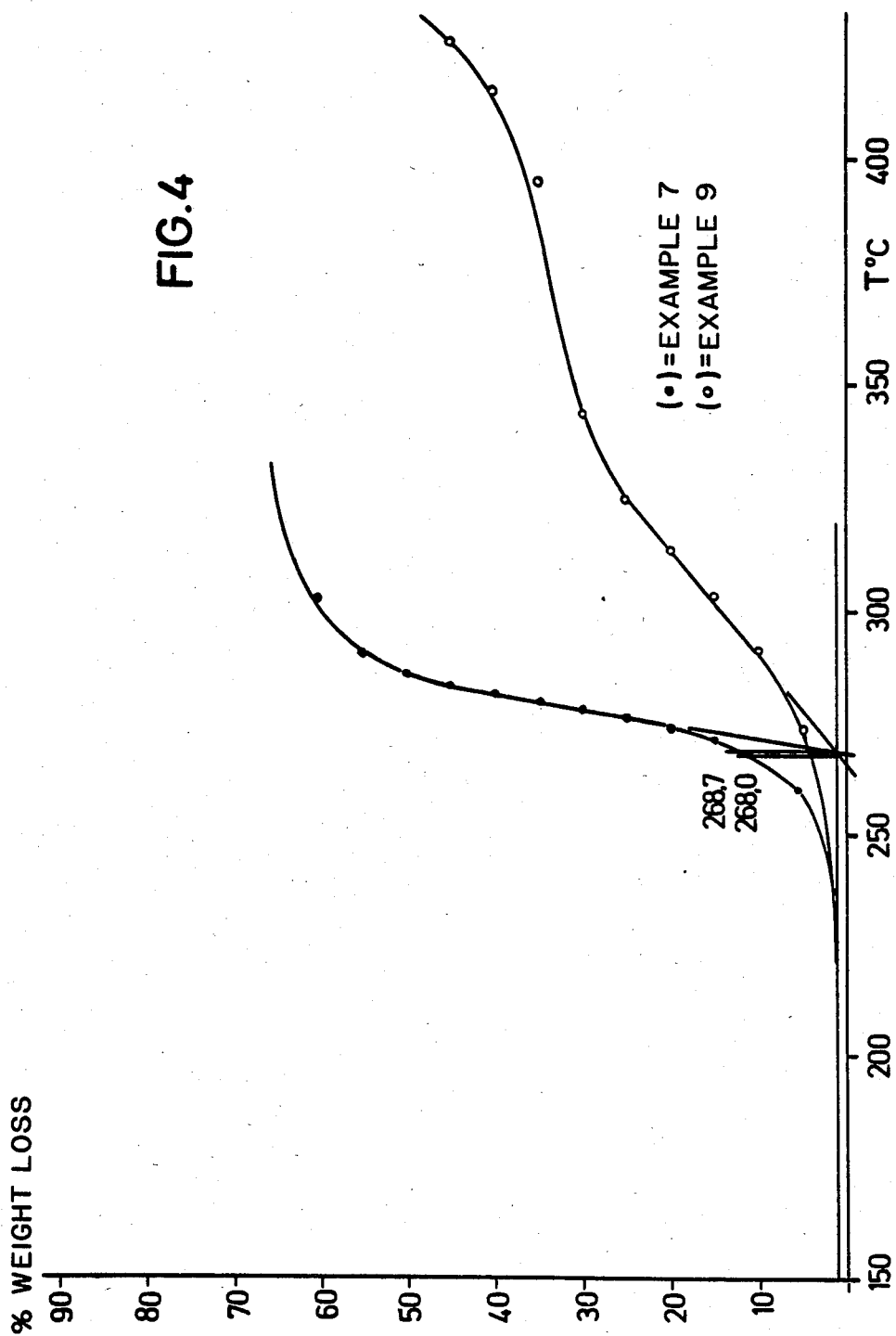

CHLORINATION OF POLYMERS

The present invention relates to a process for the chlorination of polymers to give chlorinated polymers by reacting a solid organic polymer with chlorine in the presence of a low-boiling halogen-containing organic solvent in which the polymer is dissolved or suspended, at or below the boiling point of the mixture of chlorine and solvent, the reaction being initiated with actinic light or another initiator which produces free radicals.

Processes of this type give chlorinated polymers, in particular chlorinated polyvinyl chloride and chlorinated polyethylene, which, because of their special properties, such as high heat distortion resistance and good chemical stability, are desirable materials.

It has been disclosed that polymers, such as polyvinyl chloride, polyethylene or polystyrene, can be chlorinated in suspension in water or concentrated hydrochloric acid, the reaction being initiated by UV light and chlorocarbons or chlorohydrocarbons which have a swelling action also being added (cf. U.S. Pat. Nos. 2,996,489, 2,426,808, 2,590,651, 3,100,762, 3,334,077, 3,334,078, etc.). The disadvantages of these processes are the corrosiveness of the hydrochloric acid and the fact that, in order to react with the polymer, the chlorine required for chlorination has to diffuse through the suspending agent, in which it is sparingly soluble; this takes place only slowly, even at elevated temperatures. If swelling agents are used, e.g. chlorohydrocarbons, it is difficult to remove these completely from the end products after the reaction.

It has also been disclosed that polymers, such as polyethylene or polypropylene, can be chlorinated with chlorine gas in the presence of a low-boiling chlorinated solvent, e.g. carbon tetrachloride, chloroform, 1,1,1-trichloroethane or methylene chloride, at above the boiling point of the particular solvent, under the action of UV light (cf. for example, British Patent No. 815,088). The disadvantages of these conventional processes are that the solvent is expensive to separate off, and the conventional solvents do not swell the polymer satisfactorily, particularly when the polymer in question is polyvinyl chloride. This results in a chlorination product in which the chlorine is inhomogeneously distributed. Although swelling can be carried out more effectively at elevated temperatures, the chlorination products exhibit reduced thermal stability.

It is an object of the present invention to provide a process for the chlorination of polymers in suspension or solution, the process being free of the disadvantages described above. Further objects of the invention are to achieve a good random distribution of the chlorine in the chlorinated polymer during chlorination, to provide products having good thermal stability, and to increase the reaction rate for the reaction of the chlorine with the polymer.

We have found that these objects are achieved if the solvent consists of from 20 to 100% by weight of phosgene. Preferably, the solvent consists of phosgene or of a mixture of not less than 50% by weight of phosgene and a chlorofluorocarbon or a chlorofluorohydrocarbon. A solvent mixture consisting of not less than 50% by weight of phosgene and chlorotrifluoromethane is particularly preferred. We have found that these objects are furthermore achieved by chlorinated polymers obtained by the process according to the invention.

Suitable polymers for the process for the chlorination of polymers with chlorine are all solid organic, high molecular weight polymers which can be reacted with chlorine to give chlorinated polymers. These include, in particular, polyvinyl chloride, polyvinylidene chloride and copolymers of vinyl chloride with monoolefinically unsaturated compounds, having molecular weights of from 100,000 to 1,000,000, polystyrenes, and olefin polymers, such as polyethylene, polypropylene, ethylene/propylene copolymers or polybutenes. The chlorination of such solid polymers is known per se, so that a more detailed description is unnecessary. The chlorination reaction gives chlorinated polymers which have a high chlorine content, usually from 25 to 75% by weight. For example, polyethylene gives chlorinated polyethylene containing from 18 to 48% by weight of chlorine, and polyvinyl chloride, which has a chlorine content of from 55 to 57% by weight, gives chlorinated polymers having a chlorine content as high as 75% by weight.

The chlorination of the above polymers is usually carried out in low-boiling halogenated organic solvents These are liquid organic media which dissolve organic or inorganic substances without changing them chemically, and evaporate from the solutions leaving behind the chemically unchanged substances. In the present case, the polymer can be either dissolved or swelled and/or suspended by the solvent. Particularly suitable solvents are tetrachloromethane, chloroform, 1,1,1-trichloroethane, methylene chloride, tetrachloroethane, dichlorobenzene, chlorotrifluoromethane, fluorotrichloromethane, etc. The chlorination of polymers in these solvents is prior art, and is described in, for example, British Patent Nos. 815,088 and 1,004,193, Canadian Patent No. 854,775 and U.S. Pat. No. 3,597,408. In conventional processes, the reaction with chlorine is carried out at or below the boiling point of the solvent, by initiating the chlorination reaction with actinic light. Initiation can be effected with any type of actinic light, as is produced by conventional light bulbs, halogen lamps, neon lamps, UV mercury vapor lamps, electric arcs, etc. However, UV light is particularly suitable. Other initiators which produce free radicals can also be employed, such as small amounts of organic or inorganic peroxides which decompose to give free radicals (cf. U.S. Pat. No. 4,386,189).

The chlorination reaction can be carried out at atmospheric or superatmospheric pressure. The reaction of chlorine with the polymer is frequently effected in the absence of air.

In the novel process, the above chlorination of the polymers with chlorine is carried out in a halogen-containing organic solvent which comprises from 20 to 100, in particular from 50 to 100% by weight of phosgene. Accordingly, the solvent can consist of 100% by weight of phosgene or of a mixture of from 20 to 100% by weight of phosgene and from 0 to 80% by weight of another, halogen-containing organic solvent which is soluble in phosgene. However, pure phosgene is most suitable. Preferably, the phosgene mixture contains less than 50% by weight of a chlorofluorocarbon or chlorofluorohydrocarbon, in particular chlorotrifluoromethane. Mixtures of from 70 to 85% by weight of phosgene and from 15 to 30% by weight of a chlorofluorocarbon or chlorofluorohydrocarbon are particularly preferred. The phosgene used as a solvent boils at 7.6° C. and is available commercially in compressed form in steel cylinders. Advantageously, it should have a purity greater than 95% by weight and should be colorless. In particular, no heavy metal halides or halides of boron, aluminum, tin, antimony, sulfur or phosphorus should be present.

The chlorination reaction to give the corresponding chlorinated polymer is carried out rapidly under atmospheric or superatmospheric pressure and at or below the boiling point of the mixture of phosgene and chlorine, i.e. in general at from +50° C. to −50° C. Some or all of the chlorine required for the reaction can be present at the beginning of the reaction, and the chlorine can be introduced in liquid or gaseous form into the solvent. Where relevant, the remainder of the chlorine required is added during the reaction, either continuously or a little at a time. Preferably, all of the chlorine is reacted, with the exception of the amount which escapes with the hydrogen chloride evolved from the system. When the reaction is complete, a chlorine-free suspension or solution of the chlorinated polymer in phosgene is preferably present. There is no need to separate off excess chlorine and to use this in further batches.

If polyethylene is used in the chlorination, it is advantageous to employ products having a large surface area, which can be produced by suitable polymerization in suspension or the gas phase (e.g. Ziegler polymerization) or by milling or reprecipitation (e.g. in the case of high pressure polyethylene).

The polymer/solvent (phosgene) weight ratio used depends, inter alia, on the starting polymer. Polymers having a low bulk density require a larger amount of phosgene, while those having a high bulk density require less phosgene. For example, suspensions which contain 20% by weight of polyvinyl chloride having a bulk density above 0.5 g/cm$^3$ are generally readily stirrable until the end of the reaction. The ratio can be shifted toward higher PVC contents if swelling is reduced by adding small amounts of fluorochlorohydrocarbons or fluorochlorocarbons. If, for example, a mixture of phosgene and 23% by weight of chlorotrifluoromethane is used, the PVC content of the suspension can be increased to about 35-38% by weight, the reaction time being roughly doubled but the quality of the end product being somewhat reduced. In the case of solutions, concentrations of 10% by weight cannot in general be exceeded.

Where PVC is used, it is particularly advantageous if it has a high molecular weight, so that the chlorinated PVC is suitable for extrusion and injection molding, a coarse-grained powder form, so that the suspension is readily stirrable at a relatively high concentration, and high purity, and if the material is unaged.

The process is particularly suitable for the chlorination of polyvinyl chlorides which contain from 55 to about 57% by weight of chlorine, are prepared by suspension polymerization, mass polymerization, a combination of mass and suspension polymerization, microsuspension polymerization or emulsion polymerization, and have a molecular weight of from 100,000 to 1,000,000, or the corresponding intrinsic viscosities or K values. Suspension PVC grades and mass PVC grades having a K value of not less than 40 are particularly suitable.

In contrast to many other processes, it is not absolutely necessary to use a special, particularly porous starting material for the chlorination of PVC. The swelling action of the phosgene is so great that commercial PVC grades can be used. If it is important to obtain a particularly pale chlorinated PVC, assistant-free PVC grades should be used, i.e. mass PVC grades. The assistants, generally methylcellulose or modified polyvinyl alcohols, result, during processing, in moldings having a brown discoloration. However, the color has no effect on the thermal stability.

The chlorination process can be carried out at the boiling point of the mixture of chlorine and phosgene, the heat of reaction being conducted away by evaporative cooling, or can be effected below this temperature if it is preferred to conduct the heat of reaction away through the wall of the reactor or via cooling coils with brine. The preferred reaction temperature is from −50° to +50° C. Under atmospheric pressure and with evaporative cooling the procedure is carried out at from −8° to +9° C. depending on the proportion of the chlorine required for the reaction which has been initially taken at the beginning of the initiation procedure. As the reaction proceeds, the temperature gradually increases until the boiling point of pure phosgene is reached.

The process of this invention will be more readily understood from the drawings, wherein:

FIG. 4 shows curves for determining the thermal stability of chlorinated polymers by measuring the weight loss as a function of temperature.

Figure 1:
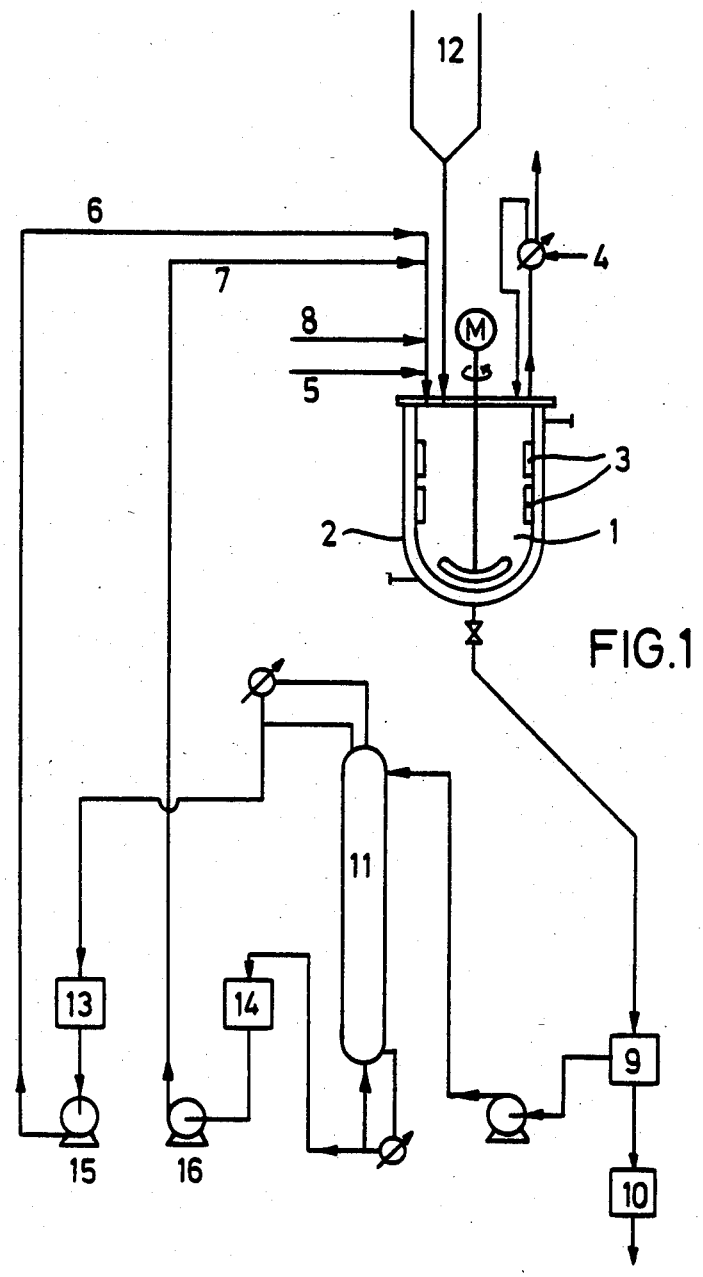
FIG. 1 is a schematic flow diagram of an apparatus for batchwise chlorination of polymers in a stirred reactor.

The chlorination is preferably carried out batchwise. FIG. 1 is a diagrammatic representation of a stirred reactor 1 which consists of a corrosion-resistant material, such as nickel, Hastelloy or enameled steel, and can be operated under atmospheric or superatmospheric pressure. The reactor is equipped with a sufficient number of UV lamps 3 to permit the reaction to proceed at an adequate rate. Furthermore, it is provided with a cooling jacket 2 and a reflux condenser 4 which serve to conduct away the heat of reaction, and to condense the entrained chlorine and phosgene from the exit gas and recycle them to the reactor.

When the reactor has been charged with the polymer from the container 12, the air is displaced by flushing with nitrogen 5. The slowly stirred reactor is then charged with the intended amount of phosgene 6, vaporized phosgene being condensed in a reflux condenser 4 and being recycled, and, if required, the fluorochlorocarbon 7 is added. The calculated amount of chlorine 8 is then added, together with a small excess of from 1 to 5% by weight, which replaces the chlorine lost with the exit gas.

While the mixture is being stirred slowly, the UV lamps 3 are then put into operation, and the reaction is started, the reaction rate being controlled via the intensity of the radiation. The preferred reaction temperature is from −30° to +25° C., but the reaction is generally carried out at from −10° to +15° C. The heat of reaction is conducted away either via the reactor wall 2, by external cooling, or via the condenser 4, by evaporative cooling. The reaction is complete when the condensed phosgene, which is colored yellow by the chlorine content, has become completely colorless, and the suspending agent or the solution is clear.

When the reaction is complete, the chlorinated polymer can be isolated from the suspension or solution by any conventional method. A preferred working up procedure comprises the addition of an inert liquid which is miscible with phosgene and which reverses the swelling of the chlorinated polymer, this swelling occurring in the case of a suspension and being due to the phosgene. In this context, the same weight as the weight of the phosgene present is generally sufficient. Aliphatic hydrocarbons, such as pentane, hexane, heptane, octane, iso-octane or aliphatic cuts of oil distillates, are particularly suitable. The mixture is then filtered (9), the filter cake is freed from the solvent 10 by a conventional method, the filtrate is separated by distillation 11 and the components are then recycled to the process via the storage tanks 13 and 14 and the pumps 15 and 16. It is also possible for the phosgene to be distilled off from the reactor after the hydrocarbon has been added, until the boiling point of the pure hydrocarbon is reached. In order to remove the phosgene completely from the chlorinated polymer, it is advantageous if the final temperature during this operation reaches more than 100° C., preferably more than 120° C. The chlorinated polymer can then be worked up to give a dry powder by filtration and drying in apparatuses which need not be corrosion-resistant. If a solution in phosgene is present when the reaction is complete, for example, an aromatic, such as toluene or xylene, or another solvent is added. When the phosgene has been distilled off, the chlorinated polymer can be isolated by precipitation with alcohol or by introducing the solution into boiling water with thorough stirring, the solvent being distilled off.

Figure 2:
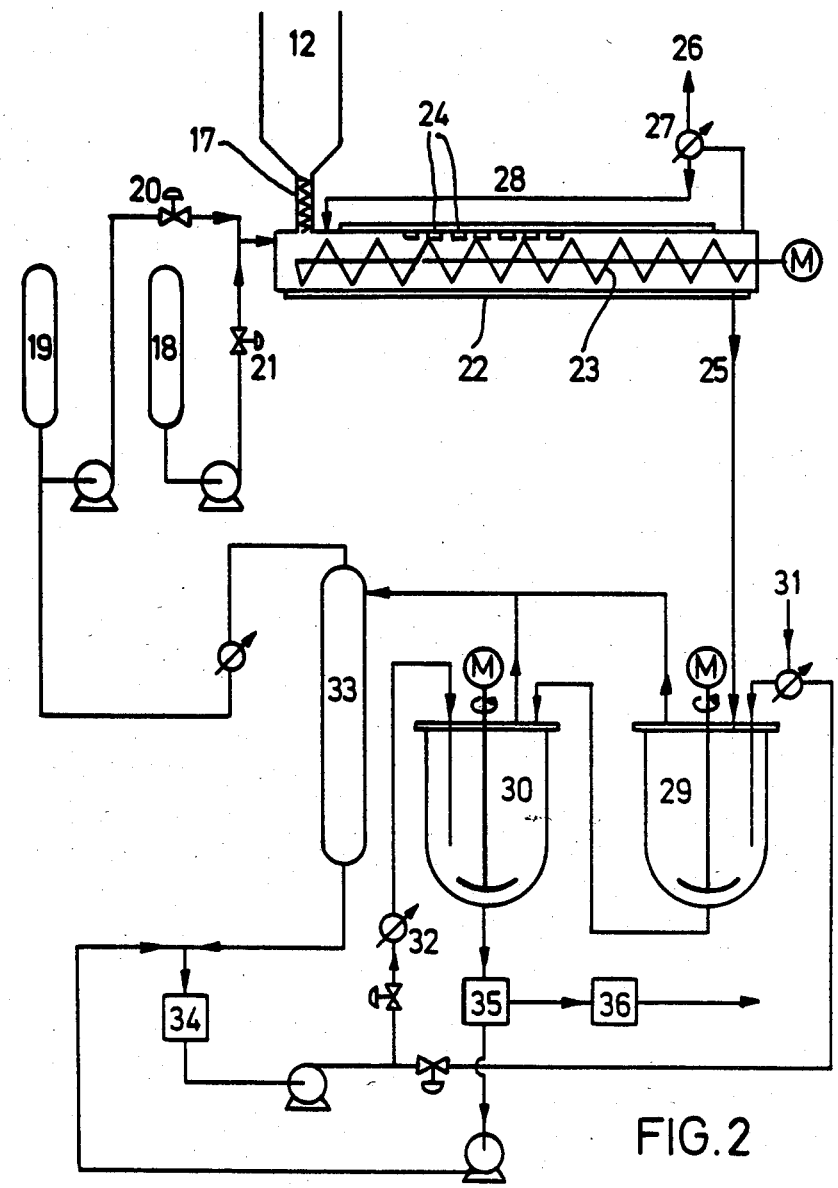
FIG. 2 is a schematic flow diagram of an apparatus for continuous chlorination of polymers in a horizontal jacketed reactor.

The reaction can also be carried out continuously (FIG. 2). The polymer, the phosgene 18 and the chlorine 19 are fed continuously into a horizontal jacketed reactor 22, the polymer being fed in via, for example, a metering screw 17, and the phosgene and the chlorine being fed in as liquids via the flow-rate controllers 20 and 21, in the desired ratio. The said reactor is equipped with an axial screw mixer 23 which transports the mixture in which the reaction is initiated by incorporated UV lamps 24, at such a rate to the reactor exit 25 that the reaction is complete there.

The hydrogen chloride formed is removed (26) and freed from phosgene and chlorine in a condenser 27, the phosgene and chlorine being recycled (28) to the reactor. The suspension which emerges is freed continuously from phosgene in 2 kettles 29 and 30 arranged in succession, heptane vapor generated in the evaporators 31 and 32 being used for this purpose. The vapor mixture is separated in a column 33, and the components are recycled to the process via the storage tanks 19 and 34. The heptane suspension formed is filtered in rotary filters 35, and the filter cake is freed from hydrocarbon in the drier 36.

The novel process has the advantage that phosgene has a more pronounced swelling action than conventional swelling agents, even at low temperatures, so that chlorine can easily diffuse into the polymer. Hence, a relatively good random distribution of the chlorine in the chlorinated polymer is achieved during chlorination. Furthermore, the reaction rate is higher than in conventional processes. The chlorination takes place very rapidly even at low temperatures and at low light intensities. When the chlorination is complete, the phosgene, because it has a low boiling point, can be removed completely from the chlorinated polymer. Where the polymer is polystyrene, a solution in phosgene is formed.

The products of this invention possess particularly good thermal stability. This improvement is especially noteworthy because it permits better thermoplastic processing. Furthermore, depending on the starting polymer, the polymer obtained has particularly little intrinsic color. The chlorinated PVC obtained in this process is particularly pale if the starting polymer does not contain any assistants, such as methylcellulose or polyvinyl alcohol. For a given chlorine content, the chlorinated PVC products according to the invention furthermore possess higher heat distortion resistance than chlorinated PVC products prepared by other processes. Hence, to produce PVC alloys with the same heat distortion resistance, a smaller amount of chlorinated PVC product is required than when conventional chlorinated PVC grades are used; this results in better processability and lower costs.

Polyethylenes chlorinated according to the invention possess particularly good thermal stability if they are prepared from polyethylene grades having a low content of heavy metal impurities.

EXAMPLES

Figure 3:
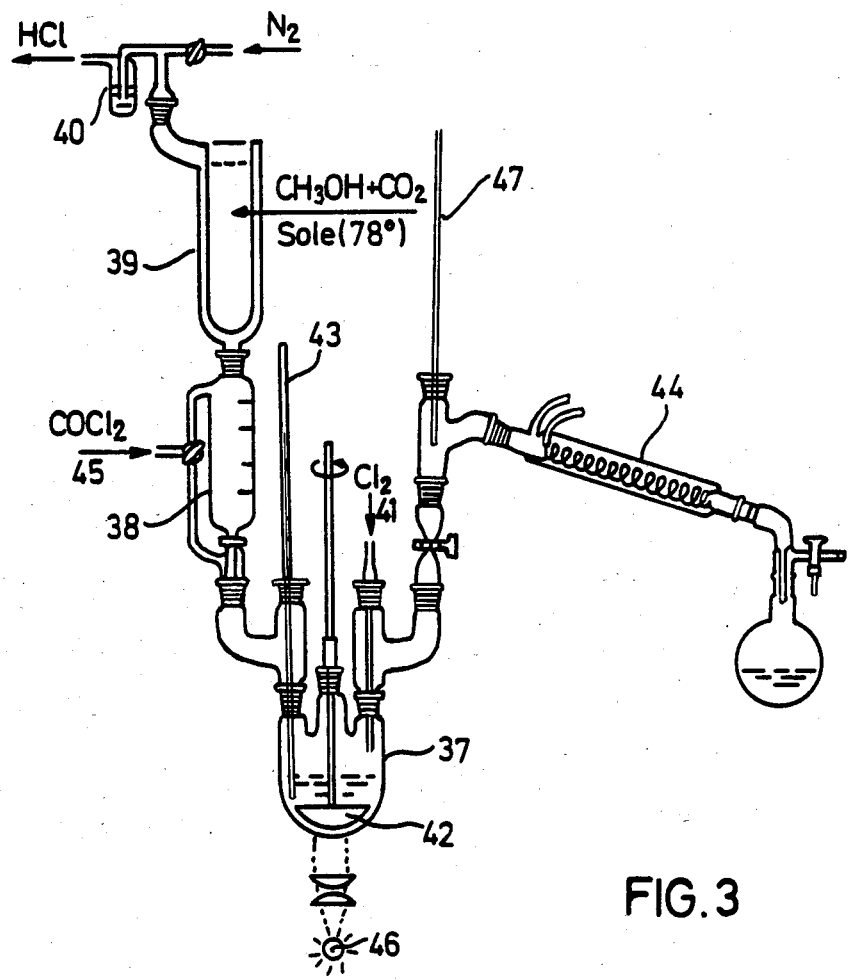
FIG. 3 shows a laboratory apparatus for chlorination of polymers in a 2-liter multi-necked flask.

FIG. 3 shows the apparatus used in the Examples. 200 g of polymer are introduced into a 2 liter quartz glass multi-necked flask 37 which is provided with a dropping funnel 38, a low-temperature reflux condenser 39, a bubble counter 40, a gas inlet tube 41, a stirrer 42, a thermometer 43 and a distillation bridge 44. The $COCl_2$ or mixture of $COCl_2$ and chlorofluoromethane, shown in the Table, is introduced through the gas feed 45, via the low-temperature reflux condenser 39, into the reaction flask 37, the vapor being condensed in the dropping funnel 38 and added with stirring. After 15 minutes, a readily stirrable suspension is obtained whose temperature is 8.6° C. The desired amount of chlorine is introduced in gaseous form into the stirred mixture, initiation with UV light 46 being carried out immediately in the case of Examples 1, 3, 4 and 5, after ⅓ of the gassing time in the case of Examples 2 and 6, and when the addition of chlorine is complete in the case of Example 7. The light power emitted by the lamp and transmitted via the optical system into the reactor 37 is about 13 watt.

When the UV lamp 46 is switched on, vigorous evolution of HCl takes place, which can be observed by means of the bubble counter 40. In general, the recondensed $COCl_2$ becomes colorless after 2 hours, and the temperature in the flask 37 increases once again to the boiling point of pure $COCl_2$.

600 ml of heptane are then added dropwise to the stirred suspension. By heating to the boiling point of heptane, which is read off on the thermometer 47, the $COCl_2$ is volatilized via the distillation bridge 44. The chlorinated polymer is filtered off under suction, and dried at 50° C. under reduced pressure.

The $COCl_2$, chlorofluoromethane and heptane recovered can be separated by distillation and then reused.

To assess the products and the comparative products mentioned, the following methods are used:

K value according to DIN 53726*
Vicat number according to DIN 53460
The content of C=O and C=C bands is determined on 600-700 μm thick pressed films using an FTIR spectrophotometer (Digilab 15 C model). The stated values are relative values which represent the quotient extinction/layer thickness (cf. J. Macromol. Sci. A Chemistry 17 (1982), 923-933).

The thermal stability is determined by 2 methods.

In method 1, 50 mg samples of the test products are heated at a rate of 2° C./min on a recording thermal balance (Mettler Thermoanalyzer 1) under nitrogen. The curves obtained in this procedure represent the weight loss as a function of temperature. The beginning of decomposition is determined graphically from these curves (FIG. 4).

In method 2, using a standard recipe, 100 parts of polymer, 2 parts of Nartovin T3 (tribasic lead sulfate from Metallgesellschaft, Frankfurt)

0.5 part of Ca stearate and 0.5 part of Pb stearate are mixed at 180° C. in a laboratory calender. When plastification has begun, the mixture is worked on a roll mill for a further 5 minutes in order to effect homogenization, after which a mill hide about 500 μm thick is produced, the color of which is assessed and from which samples are cut. These samples are stored in a drying oven heated at 180° C. The time taken for the color to change to dark brown is determined, this time being given as a measure of the stability.

EXAMPLES 1 TO 7

In these Examples, various mass and suspension PVC grades are chlorinated by the process according to the invention. The preparation conditions are reproduced in Table 1 below.

TABLE 1

Chlorination of PVC

| Example | Reaction conditions Type of PVC | K value | Frigen 11 g | Frigen 133 A g | Solids content of the suspension, % by weight | Start-up temperature, °C. | Amount of $Cl_2$ added, g | Cl in the end product, % by weight | Cl yield, % by weight |
|---|---|---|---|---|---|---|---|---|---|
| 1 | Mass PVC[1] | 58 | — | — | 10 | 2 | 62.1 | 66.8 | 99 |
| 2 | Mass PVC[1] | 58 | — | — | 25.5 | 3 | 59.6 | 66.5 | 99 |
| 3 | Suspension PVC[3] | 71 | — | — | 14 | 1.5 | 64 | 67 | 99 |
| 4 | Mass PVC[2] | 68 | — | 86 | 35 | 0 | 60 | 65.9 | 98 |
| 5 | Mass PVC[2] | 68 | 219 | — | 31 | 1 | 67 | 67.4 | 99 |
| 6 | Mass PVC[2] | 68 | — | — | 15 | 4 | 64 | 66.9 | 99 |
| 7 | Suspension PVC[4] | 78 | — | — | 15 | −2 | 65 | 66.9 | 99 |

[1]Vestolit 5867, tradename of CW Huls, Marl
[2]Vestolit 6867, tradename of CW Huls, Marl
[3]Vinoflex 7114S, tradename of BASF Aktiengesellschaft, Ludwigshafen
[4]Test material prepared by suspension polymerization
Frigen 11 = trichlorofluoromethane, $CCl_3F$, from Hoechst AG, Frankfurt
Frigen 133A = chlorotrifluoroethane, $C_2H_2ClF_3$, from Hoechst AG, Frankfurt The properties of the chlorinated end products are shown in Table 2.

TABLE 2

Chlorination of PVC

| | Properties of the end products | | Vicat temperature[2], °C. | FTIR determination of the content of | | Thermal stability in hours at 180°C. in air | Color of mill hide | Beginning of decomposition, DTA[3], heating time at 2° C./ min, under $N_2$ |
|---|---|---|---|---|---|---|---|---|
| Example | Cl content % by weight | K value[1] | | C = O (relative values) | C = C. | | | |
| 1 | 66.8 | 53 | 127 | 71.5 | 0 | 7 | Ivory | 260.6 |
| 2 | 66.5 | 54.2 | 126 | 20 | 1.8 | 7 | Ivory | 264.3 |
| 3 | 67.0 | 68 | 128 | 69 | 0 | 7 | Ochre | 266.3 |
| 4 | 65.9 | 64 | 121 | 41 | 0 | 4 | Ivory | 255 |
| 5 | 67.4 | 64.1 | 132 | 70.1 | 0 | 6 | Yellow | 265.3 |
| 6 | 66.9 | 64.6 | 125 | 36.4 | 0 | 6.5 | Ivory | 264 |
| 7 | 66.9 | 74 | 134 | — | 0 | 7 | Ivory | 268.7 |

[1]DIN 53726*
[2]DIN 53460
[3]DTA = differential thermal analysis by method 1

EXAMPLES 8 AND 9

In the Table below, the chlorination conditions for two different polyethylenes (PE) are given.

TABLE 3

Chlorination of polyethylene - the properties of the end products

| Example | Type of PE | [η] cm³/g | Specific surface area* m²/g | Density g/cm³ | $COCl_2$ g | Solids content of the suspension, % by weight | Start-up temperature | Amount of $Cl_2$ added g | Cl in the end product % by weight | Cl yield, % by weight |
|---|---|---|---|---|---|---|---|---|---|---|
| 8 | GP 5[1] | 1.1 | 0.1 | 0.9248 | 720 | 10 | 0° | 72 | 31 | ~100 |
| 9 | Lupolen[2] | 1.1 | 1 | 0.919 | 900 | 10 | 0° | 82 | 29 | ~100 |

TABLE 3-continued

Chlorination of polyethylene - the properties of the end products

| Example | Type of PE | $[\eta]$ cm³/g | Specific surface area* m²/g | Density g/cm³ | COCl₂ g | Solids content of the suspension, % by weight | Start-up temperature | Amount of Cl₂ added g | Cl in the end product % by weight | Cl yield, % by weight |
|---|---|---|---|---|---|---|---|---|---|---|
| | 1800 H | | | | | | | | | |

*N₂ adsorption (BET), determined in accordance with J. Am. Chem. Soc. 59, (1937), 2682 et seq.
¹LLDPE test product from UCC
²LDPE, commercial product from BASF, reprecipitated from xylene
[η] = intrinsic viscosity = the limiting value of the viscosity number for C → O (cf. DIN 53 726)

The properties of the resulting chlorinated polyethylenes are shown below.

TABLE 4

Chlorination of PE

| | Properties of the end products | | Beginning of decomposition, DTA, heating time at 2° C./min, under N₂ |
|---|---|---|---|
| Example | Cl content, % by weight | Color of the mill hide* | |
| 8 | 31 | white | 258.8 |
| 9 | 29 | white | 268.0 |

*preparation recipe:
100 parts of chlorinated PE,
1 part of Irgastab 17 M (butyl-tin mercaptide stabilizer from Ciba-Geigy, Basel) and 0.1 part of Irganox 1076 (octadecyl 3-(3,5-di-tert.-butyl-4-hydroxyphenyl)-propionate from Ciba-Geigy, Basel)
are worked in a roll mill at 160° C. for 5 minutes.

Mill hides are found to have a pale intrinsic color. Differential thermal analysis shows that elimination of HCl begins at a very high temperature.

EXAMPLE 10

A polypropylene (Novolen R 30, tradename of BASF Aktiengesellschaft, MFI=4.0 g/10 min, specific surface area via N₂ adsorption (BET) 1 m²/g) prepared by suspension polymerization using Ziegler catalysts is chlorinated in 25% strength by weight suspension in COCl₂ to give an end product containing 24.5% by weight of chlorine. Using a thermal balance, decomposition is found to begin at 234° C.

EXAMPLE 11

In this case, polystyrene is chlorinated. 100 g of Polystyrol 148 H (tradename of BASF Aktiengesellschaft, Ludwigshafen) are dissolved in 900 g of phosgene, and then reacted with 68 g of Cl₂ in the course of 2.5 hours with exposure to UV light until the yellow color vanishes. The initial temperature of the solution is +2° C., the boiling point of the phosgene being reached at the end of the reaction. 900 m³ of toluene are then added to the highly viscous solution, and the phosgene is distilled off until the temperature measured in the reaction flask corresponds to the boiling point of the toluene. The reaction product is precipitated from the clear solution after the latter has been stirred into 3 liters of ethyl alcohol. The white fibrous powder filtered off is dried, and the dry product is found to start decomposing at 220.4° C. It has a chlorine content of 36.3% by weight, the major part of this chlorine content (about 4/5) being bound by addition at the benzene rings.

I claim:

1. An process for the chlorination of polymers to achieve random distribution of chlorine in the chlorinated polymer and to provide products having thermal stability and to increase the reaction rate for the reaction of chlorine with the polymer which comprises reacting chlorine with a solid organic polymer which is dissolved or suspended in a halogen containing organic solvent selected from the group consisting of chlorofluorocarbon and chlorofluorohydrocarbon, said reaction being conducted in the presence of a free radical initiator and said solvent containing from about 20% to about 100%, by weight, of phosgene.

2. A process as claimed in claim 1, wherein the solvent is phosgene.

3. A process as claimed in claim 1, wherein the solvent consists of a mixture of not less than 50% by weight of phosgene and a chlorofluorocarbon.

4. A process as claimed in claim 1 wherein the solvent consists of a mixture of not less than 50% by weight of phosgene and a chlorofluorohydrocarbon.

5. A process as claimed in claim 1, wherein the solvent consists of a mixture of not less than 50% by weight of phosgene and chlorotrifluoromethane. Drawing.

* * * * *